US011832006B2

(12) United States Patent
Ramakrishnan

(10) Patent No.: US 11,832,006 B2
(45) Date of Patent: *Nov. 28, 2023

(54) IMAGE SENSOR WITH ACTIVE CAPACITANCE CANCELLATION CIRCUITRY TO REDUCE PIXEL OUTPUT SETTLING TIME

(71) Applicant: SEMICONDUCTOR COMPONENTS INDUSTRIES, LLC, Phoenix, AZ (US)

(72) Inventor: Shankar Ramakrishnan, Bangalore (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,985

(22) Filed: Oct. 12, 2022

(65) Prior Publication Data
US 2023/0063737 A1 Mar. 2, 2023

Related U.S. Application Data

(63) Continuation of application No. 17/249,233, filed on Feb. 24, 2021, now Pat. No. 11,509,844.

(51) Int. Cl.
*H04N 25/77* (2023.01)
*H04N 25/75* (2023.01)
*H04N 25/67* (2023.01)

(52) U.S. Cl.
CPC ............. *H04N 25/67* (2023.01); *H04N 25/77* (2023.01)

(58) Field of Classification Search
CPC ...... H04N 25/67; H04N 25/77; H04N 25/671; H04N 25/75
See application file for complete search history.

(56) References Cited

U.S. PATENT DOCUMENTS

| | | | |
|---|---|---|---|
| 7,612,817 B2* | 11/2009 | Tay | H04N 25/65 348/308 |
| 7,683,953 B1* | 3/2010 | Merrill | H04N 25/67 348/308 |
| 9,360,510 B2 | 6/2016 | Bruwer et al. | |
| 9,709,614 B2 | 7/2017 | Bruwer et al. | |
| 10,290,671 B2 | 5/2019 | Wang et al. | |
| 11,290,674 B1 | 3/2022 | Ebihara | |
| 2014/0085523 A1 | 3/2014 | Hynecek | |
| 2016/0282393 A1 | 9/2016 | Bruwer et al. | |
| 2017/0059699 A1 | 3/2017 | Mathe et al. | |
| 2020/0244907 A1 | 7/2020 | Ueno et al. | |
| 2022/0046199 A1* | 2/2022 | Ueno | H04N 25/671 |

FOREIGN PATENT DOCUMENTS

WO 2019026564 A1 2/2019

* cited by examiner

*Primary Examiner* — Marly S Camargo
(74) *Attorney, Agent, or Firm* — Treyz Law Group, P.C.; Jason Tsai

(57) ABSTRACT

An image sensor may include an array of image pixels arranged in rows and columns. Each column of pixels may be coupled to current source transistors and capacitance cancellation circuitry. The capacitance cancellation circuitry may include capacitors, a common source amplifier transistor, an autozero switch, a switch for selectively deactivating at least one of the capacitors during sample-and-hold reset and sample-and-hold signal operations.

20 Claims, 5 Drawing Sheets

IMAGE SENSOR WITH ACTIVE CAPACITANCE CANCELLATION CIRCUITRY TO REDUCE PIXEL OUTPUT SETTLING TIME

This application is a continuation of U.S. patent application Ser. No. 17/249,233, filed Feb. 24, 2021, which is hereby incorporated by reference herein in its entirety.

BACKGROUND

This relates generally to imaging devices and more particularly, to image sensors having large pixel arrays.

Image sensors are commonly used in electronic devices such as cellular telephones, cameras, and computers to capture images. In a typical arrangement, an electronic device is provided with an array of image pixels arranged in pixel rows and pixel columns. Larger pixel arrays can include pixel columns each of which includes hundreds or thousands of pixels coupled to a corresponding column line. A large number of pixels coupled to a column line results in high capacitance loading on that column line, which increases the pixel output settling time and limits the maximum frame rate of the image sensor. This can also cause increased column fixed pattern noise if the time allotted for settling is insufficient.

It is within this context that the embodiments described herein arise.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds or thousands or millions of pixels (e.g., megapixels). Image sensors may include control circuitry such as circuitry for operating the pixels and readout circuitry for reading out image signals corresponding to the electric charge generated by the photosensitive elements.

Figure 1:
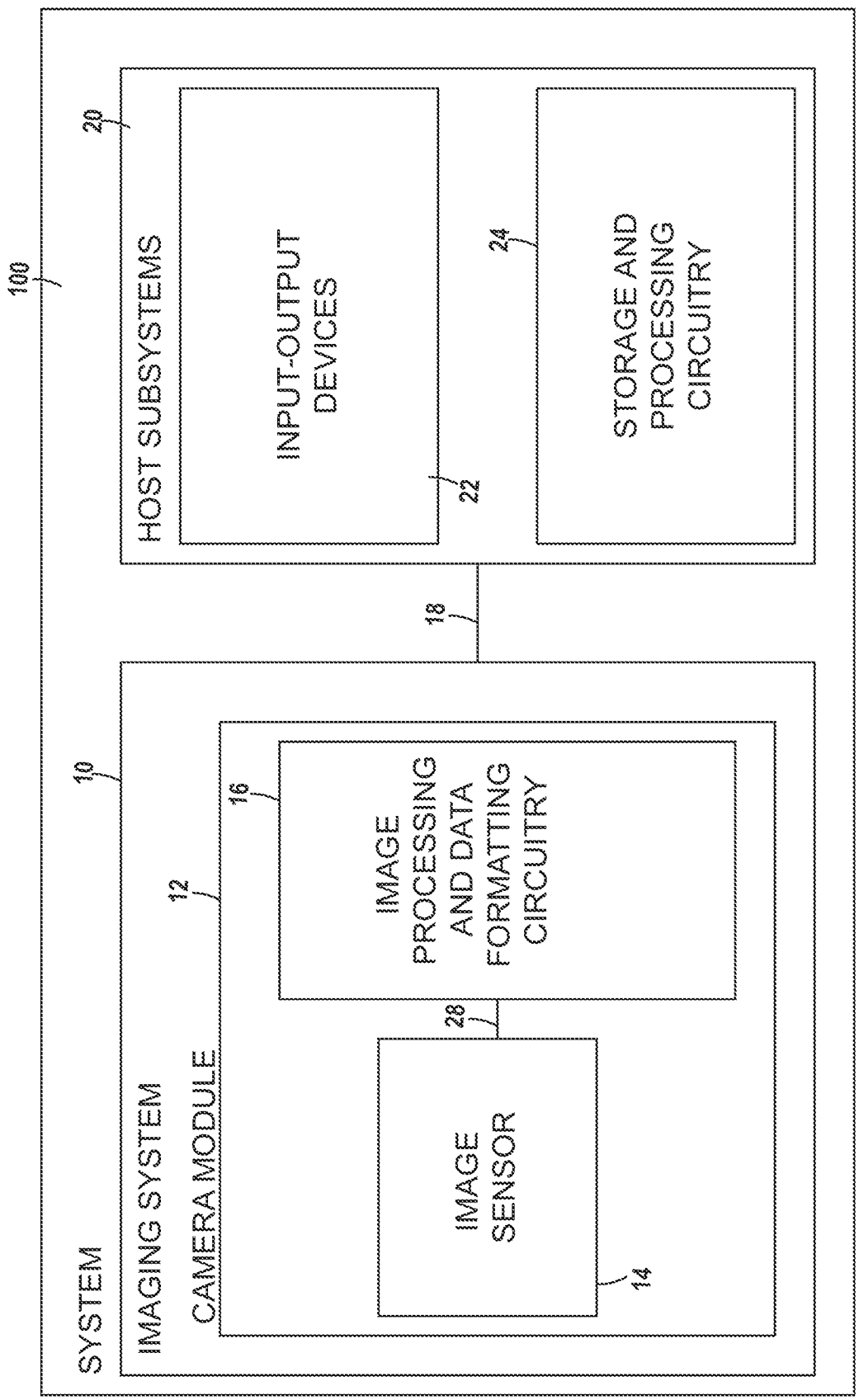
FIG. 1 is a diagram of an illustrative electronic device having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., image sensor pixels) that convert the light into digital data. Image sensors may have any number of pixels (e.g., hundreds, thousands, millions, or more). A typical image sensor may, for example, have millions of pixels (e.g., megapixels). As examples, image sensor 14 may further include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SoC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
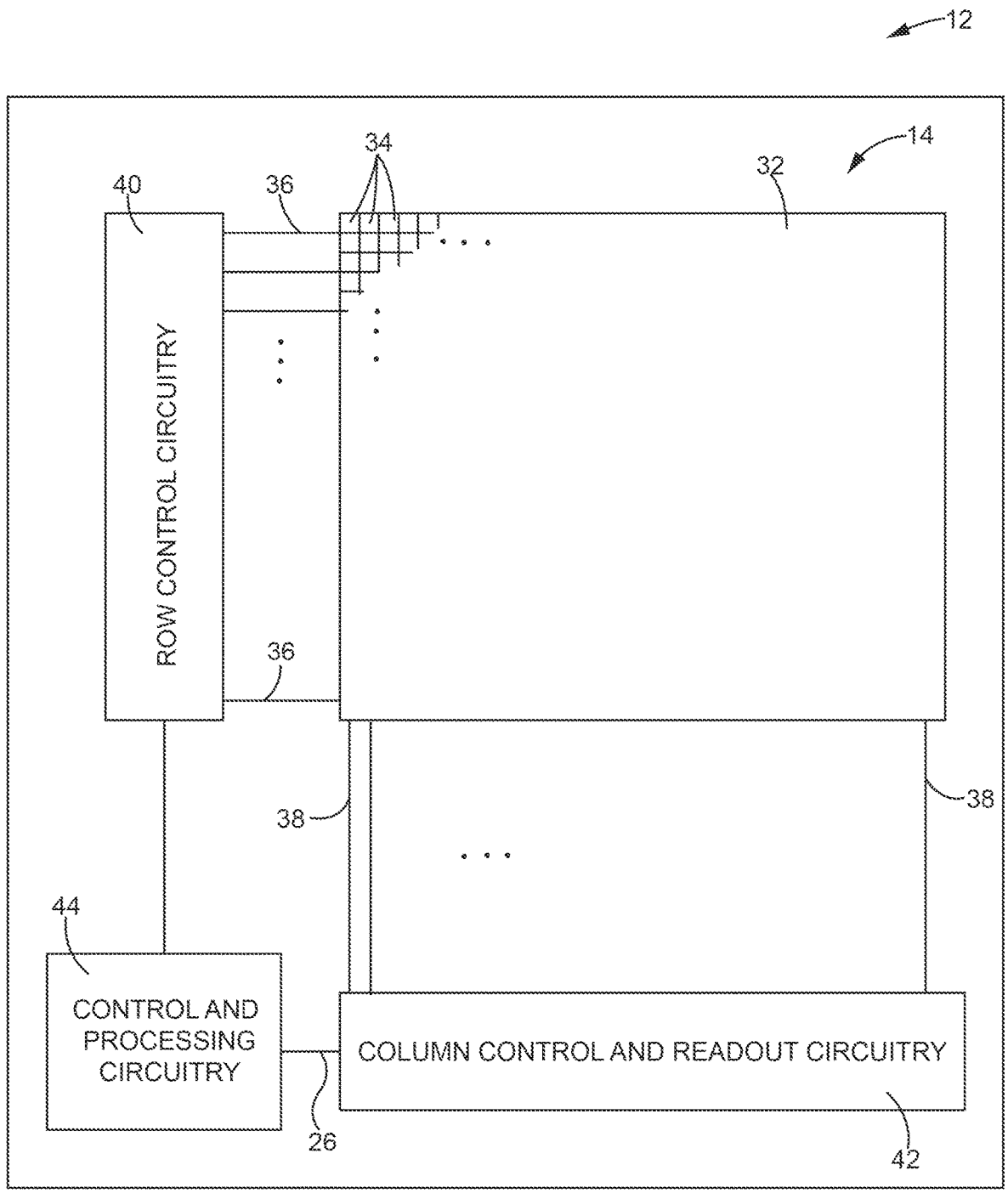
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic) may sometimes be considered part of image processing and data formatting circuitry 16 in FIG. 1. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuits 42 via data path 26.

Row control circuitry 40 may receive row addresses from control and processing circuitry 44 and may supply corresponding row control signals to image pixels 34 over control paths 36 (e.g., pixel reset control signals, charge transfer control signals, blooming control signals, row select control signals, dual conversion gain control signals, or any other desired pixel control signals).

Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Figure 3:
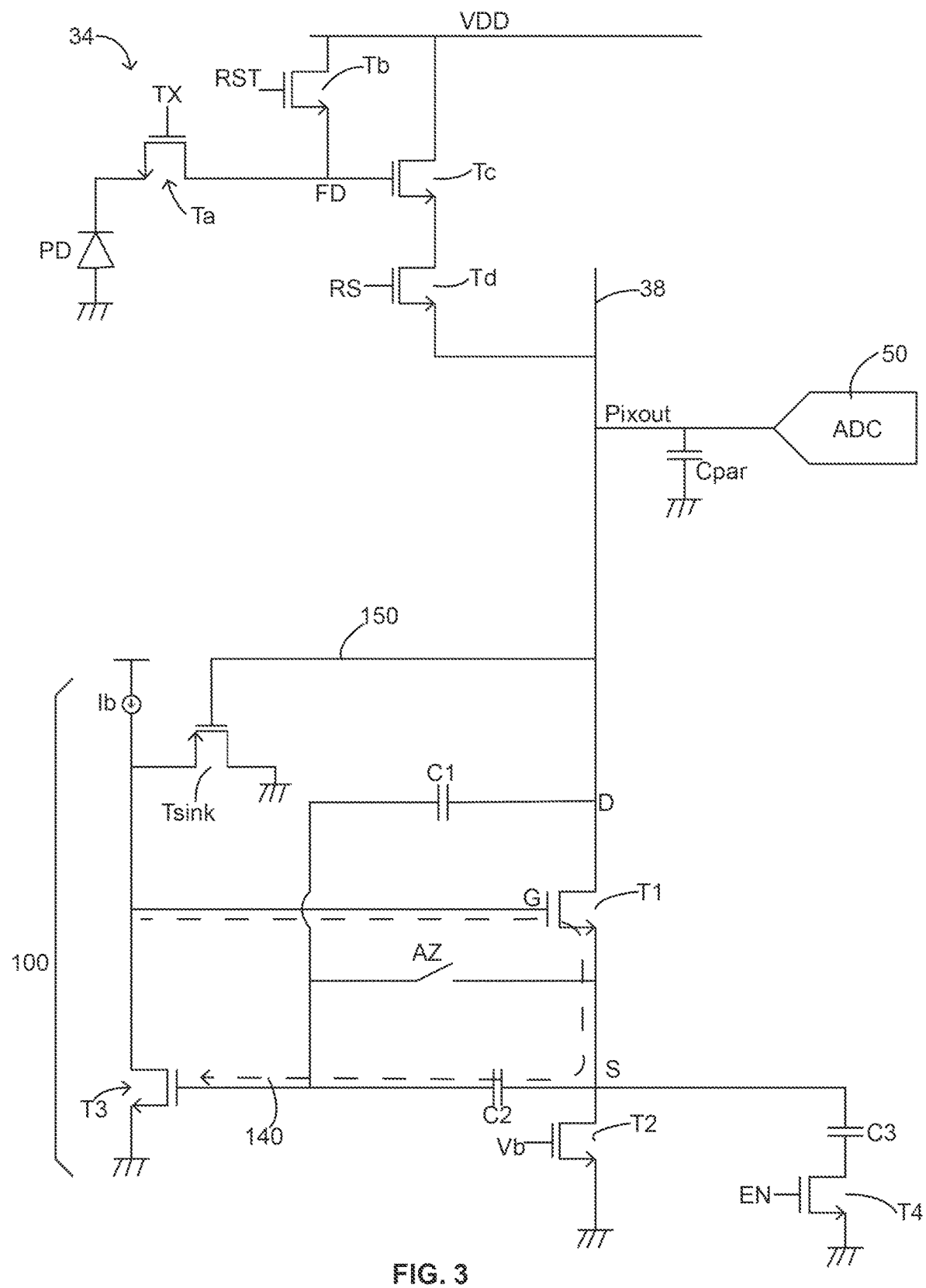
FIG. 3 is a diagram of an image sensor pixel coupled to illustrative pixel output column line capacitance cancellation circuitry in accordance with some embodiments.

FIG. 3 is a diagram of a column of image sensor pixels coupled to illustrative active clamping circuitry in accordance with some embodiments. As shown in FIG. 3, an image sensor pixel such as pixel 34 may include a photosensitive element such as a photodiode PD and a charge transfer transistor such as charge transfer transistor Ta having a first source-drain terminal coupled to photodiode PD, a second source-drain terminal coupled to floating diffusion node FD, and a gate terminal configured to receive charge transfer control signal TX. Charge transfer transistor Ta is sometimes referred to as a charge transfer gate. Floating diffusion node FD is sometimes referred to as a floating diffusion region.

Pixel 34 also includes a reset transistor Tb having a drain terminal coupled to a positive power supply line (e.g., a power supply terminal on which positive power supply voltage VDD is provided), a source terminal coupled to floating diffusion node FD, and a gate terminal configured to receive a reset control signal RST. The terms "source" terminal and "drain" terminal when referring to current-conducting terminals of a metal-oxide semiconducting transistor can be used interchangeably and are sometimes referred to as "source-drain" terminals.

Pixel 34 also includes a source follower transistor Tc having a drain terminal coupled to the positive power supply line, a gate terminal coupled to floating diffusion node FD, and a source terminal. Source follower transistor Tc is sometimes simply referred to as a "source follower." Pixel 34 may further including a row select transistor Td having a drain terminal coupled to the source terminal of source follower Tc, a gate terminal configured to receive a row select control signal RS, and a source terminal coupled to a corresponding pixel output column line 38. Line 38 may also sometimes be referred to as a pixel output line, an output line, and/or a column line.

Transistors Ta-Tb may all be n-type metal-oxide semiconductor (NMOS) transistors (e.g., n-channel devices). Although only one pixel 34 shown in FIG. 3, any number of pixels 34 may be coupled to column line 38 for readout. For example, column line 38 may be coupled to more than 10 pixels in the column, 10-100 pixels in the column, hundreds of pixels in the column, or thousands of pixels in the column.

Column line 38 may be coupled to a ground line (e.g., a ground power supply line on which a ground voltage or other low voltage is provided) via series-connected transistors T1 and T2. Transistors T1 and T2 may also be n-type transistors (e.g., NMOS devices). Transistor T2 has source terminal coupled to ground, a gate terminal configured to receive a bias voltage Vb, and a drain terminal. Transistor T1 has a source (S) terminal coupled to the drain terminal of transistor T1, a gate (G) terminal, and a drain (D) terminal coupled to column line 38. Configured in this way, transistor T2 operates as a current source transistor, whereas transistor T1 serves as a cascode transistor. Transistors T1 and T2 are sometimes referred to collectively as a very low noise (VLN) current source or VLN current source transistors.

Pixel output line 38 may be coupled to a corresponding analog-to-digital converter (ADC) circuit 50 that is configured to convert an analog signal read out from a selected signal to its digital equivalent. ADC circuit 50 may be considered part of column readout circuitry 42 (see FIG. 2). The total amount of capacitance on the pixel output line 38 may be represented by capacitance Cpar, which can be fairly high depending on the number of pixels 34 attached to line 38. As described in the Background Section, if care is not taken, the presence of high column line capacitance Cpar can limit the maximum achievable frame rate and increase the column fixed pattern noise.

To help address the high amount of Cpar that can be present on line 38 in large pixel arrays, the image sensor may be provided with pixel output column line capacitance cancellation circuitry 100 configured to reduce or cancel out at least some of the total parasitic capacitance on line 38. As shown in FIG. 3, capacitance cancellation circuitry 100 may include capacitors C1-C3, transistors T3, T4, and Tsink, a current source Ib, and an autozeroing switch AZ. Transistors T3 and T4 may be n-type transistors (e.g., NMOS devices), whereas transistor Tsink may be a p-type transistor (e.g., a PMOS device).

Capacitor C1 may have a first terminal coupled to the drain terminal of transistor T1 (which is shorted with pixel output column line 38) and a second terminal coupled to the gate terminal of transistor T3. Capacitor C2 may have a first terminal coupled to the source terminal of transistor T1 and a second terminal coupled to the gate terminal of transistor T3. Autozero switch AZ may be coupled across the two terminal of capacitor C2 (i.e., switch AZ may be coupled in parallel with capacitor C2). In an alternate embodiment, autozero switch AZ may be coupled between the gate and drain terminals of transistor T3. Capacitor C3 may have a first terminal coupled to the source terminal of transistor T1 and a second terminal coupled to ground via series-connected transistor T4. Transistor T4 has a gate terminal configured to receive an enable signal EN. Transistor T4 is therefore sometimes referred to as an enable transistor.

Transistor T3 may have a source terminal coupled to ground, a gate terminal coupled to the second terminals of capacitors C1 and C2, and a drain terminal coupled to the gate terminal of transistor T1. The current source may feed current 1b down through transistor T3. Current 1b may have a nominal current value that is optionally less than the current flowing through transistors T1 and T2. Transistor Tsink may have a source terminal coupled to the drain terminal of transistor T3, a gate terminal coupled to pixel output column line 38 via path 150, and a drain terminal coupled to ground.

Coupled together in this way, transistors T1 and T3 form a high bandwidth amplifier with the drain and source terminals of transistor T1 moving in opposite phases (e.g., an increase in voltage at the drain node D will cause a reduction in voltage at the source node S, whereas a decrease in voltage at drain node D will cause an increase in voltage at source node S). The feedback path of the amplifier is shown as path 140, where transistor T1 is part of the feedback loop. Transistor T3 is configured as a common source gain stage to provide a voltage gain. A common source amplifier transistor may be defined as a transistor having a source terminal coupled to a ground power supply line, a gate terminal configured as an input for the common source stage, and a drain terminal that serves as a output on which an amplified voltage signal is generated. Because of the voltage gain of transistor T3, the impedance at node S is low, so any unwanted poles are effectively removed which decreases the settling time. The gate terminal of transistor T3 acts as a virtual ground node.

The ratio of the capacitance of C1 to C2, defined herein as ratio A (i.e., A is equal to C1/C2), determines how the voltage at nodes D and S changes. Ratio A may be equal to one, two, three, four, five, 1-5, equal to or greater than one, at least two, at least three, at least four, at least five, 1-10, or other suitable gain ratio. The desired ratio A may be achieved by sizing capacitors C1 and C2 appropriately. In general, the capacitance of C1 may be at least equal to or greater than the capacitance of C2. The small signal swing at the source node S of transistor T1 is −A times the swing at the drain terminal of transistor T1, which is shorted to pixel output column line 38. As an example, assuming ratio A is equal to one (i.e., the capacitance of C1 is equal to the capacitance of C2), a 10 mV increase at node D will result in a 10 mV drop at node S. As another example, assuming ratio A is equal to two (i.e., the capacitance of C1 is twice the capacitance of C2), a 10 mV increase at node D will result in a 20 mV drop at node S. By making ratio A greater than unity (one), the required value of capacitance C3 can be reduced.

Figure 4:
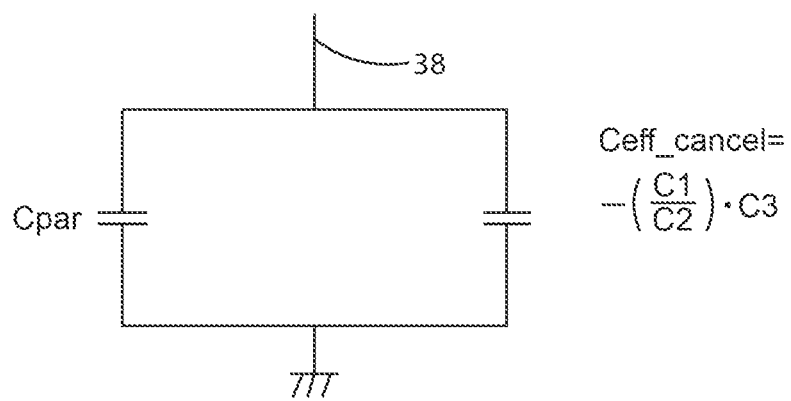
FIG. 4 is a diagram of an equivalent circuit showing effective capacitances on a pixel output column line in accordance with some embodiments.

Thus, since capacitor C3 is coupled between node S and ground, it will be reflected at the pixel output line 38 as −A*C3. FIG. 4 is a diagram of an equivalent circuit showing effective capacitances on pixel output column line 38. As shown in FIG. 4, an effective cancelling capacitance Ceff_cancel that is equal to negative (C1/C2)*C3 is reflected at line 38, which can cancel or null out at least a portion of the large capacitance Cpar. The value of Ceff_cancel should be a fraction of Cpar. As an example, the value of Ceff_cancel should be less than 75% of Cpar. As another example, the value of Ceff_cancel should be more than 75% of Cpar. As another example, the value of Ceff_cancel should be equal to 50% of Cpar. As another example, the value of Ceff_cancel should be equal to 25% of Cpar. In general, the value of Ceff_cancel can be between 10-90% or 20-80% of Cpar. Using circuitry 100 to at least partially cancel out some of Cpar in this way can result in a substantial decrease in the small signal settling time, which can also reduce column fixed pattern noise. Capacitance cancelling circuitry 100 can be easily integrated with the existing VLN current source, has modest area overhead, and has negligible contribution to read noise by using transistor T4 to switch capacitor C3 out of use at the appropriate moment without disturbing the signal settling time.

Capacitors C1 and C2 can have relatively small capacitance values compared to the capacitance of capacitor C3. For example, capacitors C1 and C2 can have capacitance values that are less than 1 pF, less than 0.1 pF or other suitable capacitance values. Moreover, capacitors C1 and C2 do not load the pixel output column line 38 since the current flowing through them is fed back into transistor T2. Capacitor C3 can be switched out of use using transistor T4 (e.g., by selectively deasserting or driven low signal EN to deactivate transistor T4) in order to minimize the noise contribution of circuitry 100. Transistor T4 can be a thin-oxide device, whereas the remaining transistors in circuitry 100 should be thick-oxide devices as they are coupled to higher voltage levels (e.g., >1 V). The charge injection due to turning off transistor T4 is negligible in this configuration.

Figure 5:
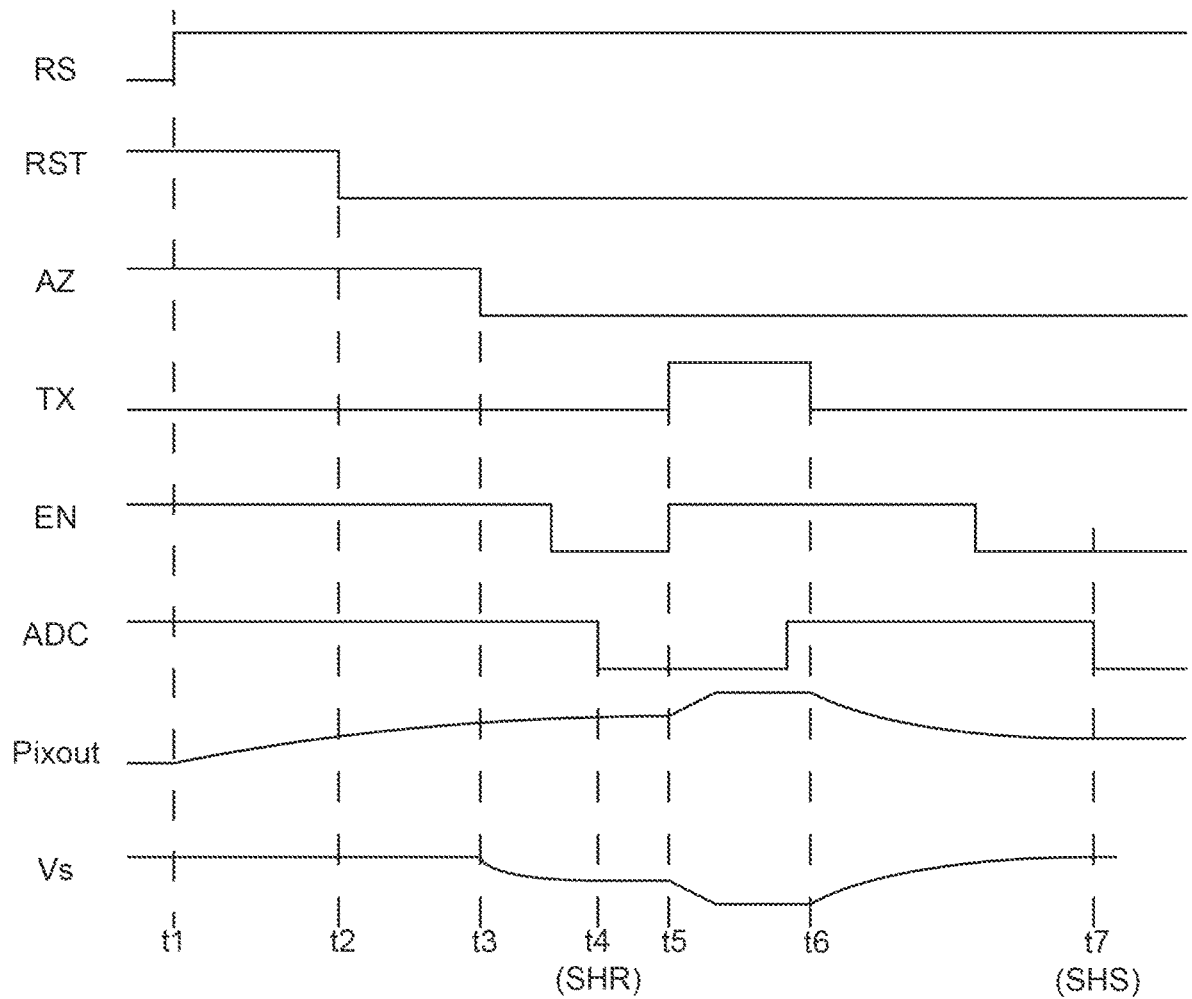
FIG. 5 is a timing diagram illustrating the operation of an image sensor pixel and pixel output column line capacitance cancellation circuitry of the type shown in FIG. 3 in accordance with some embodiments.

An illustrative operation of image sensor pixel 34 and pixel output column line capacitance cancellation circuitry 100 is shown in FIG. 5. Prior to time t1, reset control signal RST may be asserted (driven high) to activate the reset transistor to reset the floating diffusion node FD to supply voltage VDD). The autozero switch should also be turned on prior to time t1 to set a DC voltage level at the gate terminal of common source transistor T3. At time t1, the row select signal RS may be asserted (driven high) to turn on the row select transistor to couple the image pixel to the pixel output column line. At this time, the voltage of the pixel output column line (see Pixout waveform) may begin increasing towards the reset voltage level VDD. At time t2, reset signal RST may be deasserted (driven low).

At time t3, the autozeroing switch may be deactivated (turned off). In general, the autozero switch should be kept on until the column line voltage Pixout has entered the small signal region and is close to the final value (e.g., within a 100 mV of the final voltage level during the sample-and-hold reset (SHR) operation. Once the autozero switch is turned off, the voltage at source node S will be allowed to vary in the opposite polarity of the drain node D depending on the predetermined capacitance ratio A (see, e.g., source node waveform Vs, which changes in the opposite direction as Pixout). Enough voltage margin should be given to ensure that transistor T2 does not enter the triode region of operation when this happens.

At time t4, the SHR operation is performed, as indicated by the falling edge of the ADC sample-and-hold enable signal. The enable signal EN should be deasserted (driven low) during the SHR operation to switch capacitor C3 out of use shortly before the falling edge of the ADC sample-and-hold signal. Transistors T1 and T2 should remain in the drain saturation region until the final SHR value is reached.

At time t5, the transfer control signal TX is pulsed high to transfer charge from the photodiode to the floating diffusion node, and the enable signal EN is driven high to reactivate transistor T4. At this point, Pixout will charge up. At time t6, the charge transfer control signal TX is deasserted (driven low). At this time, the Pixout voltage may begin decreasing, which causes voltage Vs to increase in the opposite direction. The autozero switch should not be turned on again during SHS since it will alter the DC operating current between the SHR and SHS operations due to the shift in the steady state value of node S. The enable signal EN should once again be deasserted (driven low) during the SHS operation to switch capacitor C3 out of use shortly before the falling edge of the ADC sample-and-hold signal.

At time t7, the sample-and-hold signal (SHS) operation is performed, as indicated by the falling edge of the ADC sample-and-hold signal. During the SHS operation, the common source transistor T3 may turn off while cascode transistor T1 may enter the triode region for large signal swings. P-channel transistor Tsink can provide a path to sink current Ib whenever this occurs (e.g., the sink transistor is configured to receive current Ib when the Pixout voltage is low). P-channel transistor Tsink is optional and can help prevent row banding issues.

The timing and order of operations as shown in FIG. 5 is merely illustrative. At least some of the described steps may be modified or omitted; some of the described steps may be performed in parallel; additional steps may be added or inserted between the described steps; the order of certain steps may be reversed or altered; the timing of the described steps may be adjusted so that they occur at slightly different times, or the described steps may be distributed in a system.

Various embodiments of an image sensor that includes pixel output line capacitance cancellation circuitry are provided. In accordance with some embodiments, an image sensor is provided that includes: an image sensor pixel; a pixel output line coupled to the image sensor pixel; a current source transistor having a drain terminal coupled to the pixel output line, having a source terminal coupled to a ground line, and having a gate terminal configured to receive a bias voltage; a cascode transistor having a drain terminal coupled to the pixel output line, having a source terminal coupled to the drain terminal of the current source transistor, and having a gate terminal; and a common source amplifier transistor having a source terminal coupled to the ground line, a gate terminal coupled to the source terminal of the cascode transistor, and a drain terminal coupled to the gate terminal of the cascode transistor.

The image sensor can further include a first capacitor having a first terminal coupled to the drain terminal of the cascode transistor and having a second terminal coupled to the gate terminal of the common source amplifier transistor; a second capacitor having a first terminal coupled to the source terminal of the cascode transistor and having a second terminal coupled to the gate terminal of the common source amplifier transistor; a third capacitor having a first terminal coupled to the source terminal of the cascode transistor and having a second terminal; an enable transistor having a drain terminal coupled to the second terminal of the third capacitor, having a source terminal coupled to the ground line, and having a gate terminal configured to receive an enable signal; a current source configured to provide a bias current to the common source amplifier transistor; and an autozero switch coupled in parallel with the second capacitor. The image sensor can further include a p-channel transistor having a source terminal coupled to the drain terminal of the common source amplifier transistor, a drain terminal coupled to the ground line, and a gate terminal coupled to the pixel output line.

In accordance with some embodiments, an image sensor is provided that includes an image sensor pixel; a pixel output line coupled to the image sensor pixel; a first transistor having a drain terminal coupled to the pixel output line, having a gate terminal, and having a source terminal; a second transistor having a drain terminal coupled to the source terminal of the first transistor, a gate terminal configured to receive a bias voltage, and a source terminal shorted to a ground line; and a third transistor coupled to the first transistor in a feedback arrangement such that a change in voltage at the drain terminal of the first transistor causes an opposite change in voltage at the source terminal of the first transistor. The image sensor can further include a first capacitor having a first terminal coupled to the drain terminal of the first transistor and a second terminal coupled to the gate terminal of the third transistor, a second capacitor having a first terminal coupled to the source terminal of the first transistor and a second terminal coupled to the gate terminal of the third transistor (where the first capacitor has a larger capacitance than the second capacitor), and a third capacitor coupled to the source terminal of the first transistor, wherein the third capacitor is selectively configured to at least partially cancel 20-80% of the capacitance on the pixel output line.

In accordance with some embodiments, an image sensor pixel is provided that includes a pixel output line coupled to the image sensor pixel; and capacitance cancellation circuitry coupled to the pixel output line, where the capacitance cancellation circuitry comprises first, second, and third capacitors configured to at least partially cancel a capacitance on the pixel output line. The capacitance cancellation circuitry can further include a common source amplifier transistor having a gate terminal directly coupled to the first and second capacitors and an enable transistor configured to switch the third capacitor out of use during sample-and-hold reset operations and during sample-and-hold signal operations.

The foregoing is merely illustrative of the principles of this invention and various modifications can be made by those skilled in the art without departing from the scope and spirit of the invention. The foregoing embodiments may be implemented individually or in any combination.

What is claimed is:
1. An optical sensor comprising:
   a pixel;
   an output line coupled to the pixel;
   a cascode transistor having a drain terminal coupled to the output line, a source terminal coupled to a ground line, and a gate terminal; and
   a common source amplifier transistor having a source terminal coupled to the ground line, a drain terminal coupled to the gate terminal of the cascode transistor, and a gate terminal coupled to the source terminal of the cascode transistor.

2. The optical sensor of claim 1, further comprising:
a current source transistor having a drain terminal coupled to the source terminal of the cascode transistor, a source terminal coupled to the ground line, and a gate terminal configured to receive a bias voltage.

3. The optical sensor of claim 1, further comprising:
a current source transistor coupled in series with the cascode transistor.

4. The optical sensor of claim 1, further comprising:
a current sink transistor coupled between the output line and the common source amplifier transistor.

5. The optical sensor of claim 4, wherein the current sink transistor has a gate terminal coupled to the output line and a source terminal coupled to the drain terminal of the common source amplifier transistor.

6. The optical sensor of claim 5, wherein the current sink transistor has a drain terminal coupled to the ground line.

7. The optical sensor of claim 5, wherein the current sink transistor comprises a p-type transistor and wherein the common source amplifier transistor comprises an n-type transistor.

8. The optical sensor of claim 1, further comprising:
an enable transistor having a drain terminal coupled to the source terminal of the cascode transistor, a source terminal coupled to the ground line, and a gate terminal configured to receive an enable signal.

9. The optical sensor of claim 1, further comprising:
an autozero switch coupled between the source terminal of the cascode transistor and the gate terminal of the common source amplifier transistor.

10. The optical sensor of claim 1, further comprising:
a capacitor having a first terminal coupled to the drain terminal of the cascode transistor and having a second terminal coupled to the gate terminal of the common source amplifier transistor.

11. The optical sensor of claim 1, further comprising:
a capacitor having a first terminal coupled to the source terminal of the cascode transistor and having a second terminal coupled to the gate terminal of the common source amplifier transistor.

12. The optical sensor of claim 1, further comprising:
a capacitor having a first terminal coupled to the source terminal of the cascode transistor and having a second terminal coupled to an enable switch.

13. Imaging circuitry comprising:
a pixel;
an output line coupled to the pixel;
a first transistor having a first source-drain terminal coupled to the output line and having a second source-drain terminal coupled to a power supply line; and
a second transistor coupled to the first transistor in a feedback arrangement such that a change in voltage at the first source-drain terminal of the first transistor causes an opposite change in voltage at the second source-drain terminal of the first transistor.

14. The imaging circuitry of claim 13, further comprising:
a current source transistor having a first source-drain terminal coupled to the second source-drain terminal of the first transistor, a second source-drain terminal coupled to the power supply line, and a gate terminal configured to receive a bias voltage.

15. The imaging circuitry of claim 13, further comprising:
a first capacitor having a first terminal coupled to the first source-drain terminal of the first transistor and having a second terminal coupled to a gate terminal of the second transistor.

16. The imaging circuitry of claim 15, further comprising:
a second capacitor having a first terminal coupled to the second source-drain terminal of the first transistor and having a second terminal coupled to the gate terminal of the second transistor.

17. The imaging circuitry of claim 16, further comprising:
a third capacitor having a first terminal coupled to the second source-drain terminal of the first transistor and having a second terminal coupled to an enable switch.

18. A sensor comprising:
an optical sensor pixel;
an output line coupled to the optical sensor pixel; and
capacitance cancellation circuitry coupled to the output line and including at least one transistor and at least one capacitor configured to at least partially cancel a capacitance on the output line.

19. The sensor of claim 18, wherein the capacitance cancellation circuitry comprises:
a first transistor having a first source-drain terminal coupled to the output line; and
a second transistor having a source-drain terminal coupled to a gate terminal of the first transistor and having a gate terminal coupled to a second source-drain terminal of the first transistor.

20. The sensor of claim 18, wherein the capacitance cancellation circuitry comprises:
a first capacitor coupled between a first source-drain terminal of the at least one transistor and a node; and
a second capacitor coupled between a second source-drain terminal of the at least one transistor and the node.

* * * * *